United States Patent
Imran (10) Patent No.: US 8,445,111 B2
(45) Date of Patent: May 21, 2013

(54) GADOLINIUM OXIDE-DOPED ZIRCONIUM OXIDE OVERCOAT AND/OR METHOD OF MAKING THE SAME

(75) Inventor: Muhammad Imran, Brownstown, MI (US)

(73) Assignee: Guardian Industries Corp., Auburn Hills, MI (US)

(*) Notice: Subject to any disclaimer, the term of this patent is extended or adjusted under 35 U.S.C. 154(b) by 370 days.

(21) Appl. No.: 12/923,936

(22) Filed: Oct. 14, 2010

(65) Prior Publication Data

US 2012/0094112 A1    Apr. 19, 2012

(51) Int. Cl.
*B32B 17/06* (2006.01)
*C03C 25/22* (2006.01)
*C03C 25/46* (2006.01)
*C03C 25/52* (2006.01)

(52) U.S. Cl.
USPC ........... 428/426; 428/428; 428/434; 428/220; 204/192.1

(58) Field of Classification Search
None
See application file for complete search history.

(56) References Cited

U.S. PATENT DOCUMENTS

| | | | |
|---|---|---|---|
| 5,376,455 A | 12/1994 | Hartig et al. | |
| 5,584,902 A | 12/1996 | Hartig et al. | |
| 6,475,626 B1 | 11/2002 | Stachowiak | |
| 6,558,800 B1 | 5/2003 | Stachowiak | |
| 6,589,657 B2* | 7/2003 | Dannenberg | 428/432 |
| 6,605,358 B1 | 8/2003 | Stachowiak | |
| 6,692,831 B2 | 2/2004 | Stachowiak | |
| 6,730,352 B2 | 5/2004 | Stachowiak | |
| 6,863,928 B2 | 3/2005 | Stachowiak | |
| 6,890,659 B2 | 5/2005 | Stachowiak | |
| 6,908,679 B2 | 6/2005 | Stachowiak et al. | |
| 6,967,060 B2 | 11/2005 | Stachowiak | |
| 7,147,924 B2 | 12/2006 | Stachowiak | |
| 7,150,916 B2 | 12/2006 | Lemmer et al. | |
| 7,189,458 B2 | 3/2007 | Ferreira et al. | |
| 7,198,851 B2 | 4/2007 | Lemmer et al. | |
| 7,217,461 B2 | 5/2007 | Ferreira et al. | |
| 7,419,725 B2 | 9/2008 | Neuman et al. | |
| 7,521,096 B2 | 4/2009 | Lemmer et al. | |
| 7,537,677 B2 | 5/2009 | Lu et al. | |
| 7,695,785 B2 | 4/2010 | Lu et al. | |
| 2003/0044652 A1 | 3/2003 | Wang | |
| 2004/0069616 A1 | 4/2004 | Wang | |

(Continued)

OTHER PUBLICATIONS

International Search Report dated Dec. 21, 2011.

(Continued)

*Primary Examiner* — David Sample
(74) *Attorney, Agent, or Firm* — Nixon & Vanderhye P.C.

(57) ABSTRACT

Certain example embodiments relate to a coated article including at least one infrared (IR) reflecting layer in a low-E coating. In certain examples, at least one layer of the coating is of or includes zirconium oxide (e.g., $ZrO_2$) doped with gadolinium and/or gadolinium oxide (e.g., $Gd_2O_3$ or other suitable stoichiometry). Providing a layer including Gd-doped zirconium oxide as the uppermost or overcoat layer of the coated article (e.g., over a silicon nitride based layer) advantageously results in improved durability, and chemical and heat stability in certain example embodiments. Coated articles herein may be used in the context of insulating glass (IG) window units, vehicle windows, or in other suitable applications such as monolithic window applications, laminated windows, and/or the like.

27 Claims, 4 Drawing Sheets

U.S. PATENT DOCUMENTS

| | | |
|---|---|---|
| 2007/0049023 A1* | 3/2007 | Ahn et al. ............. 438/685 |
| 2007/0128451 A1 | 6/2007 | Ferreira et al. |
| 2008/0044663 A1* | 2/2008 | Freling et al. ............. 428/426 |
| 2009/0115922 A1 | 5/2009 | Veerasamy |
| 2009/0205956 A1 | 8/2009 | Lu et al. |
| 2009/0214880 A1 | 8/2009 | Lemmer |
| 2009/0263596 A1 | 10/2009 | Lao et al. |
| 2009/0324934 A1 | 12/2009 | Blacker et al. |
| 2009/0324967 A1 | 12/2009 | Disteldorf et al. |
| 2010/0075155 A1 | 3/2010 | Veerasamy |
| 2010/0104840 A1 | 4/2010 | Blacker et al. |
| 2010/0206290 A1 | 8/2010 | Thomsen et al. |
| 2010/0209729 A1 | 8/2010 | Thomsen et al. |
| 2010/0209730 A1 | 8/2010 | Thomsen et al. |

OTHER PUBLICATIONS

"Structure and Optical Properties of Nanocrystalline Gadolinium Doped Zirconia Thin Films", Krishna et al., International Journal of Modern Physics B, vol. 16, No. 26 (2002), pp. 4017-4025.

"Using New Film-Forming Materials—Gadolinium Zirconate and Lutetium Zirconate—to Obtain High-Quality Optical Coatings", Vasil'Eva et al., 2007 Optical Society of America, pp. 712-716.

U.S. Appl. No. 12/453,124, filed Apr. 29, 2009; Frank et al.

U.S. Appl. No. 12/453,836, filed May 22, 2009; Ferreira et al.

U.S. Appl. No. 12/662,561, filed Apr. 22, 2010; Knoll et al.

U.S. Appl. No. 12/662,562, filed Apr. 22, 2010; Knoll et al.

\* cited by examiner

Figure 6

GADOLINIUM OXIDE-DOPED ZIRCONIUM OXIDE OVERCOAT AND/OR METHOD OF MAKING THE SAME

FIELD OF THE INVENTION

Certain example embodiments of this invention relate to a coated article including at least one infrared (IR) reflecting layer of a material such as silver or the like in a low-E coating. In certain embodiments, at least one layer of the coating is of or includes zirconium oxide (e.g., $ZrO_x$), which may be doped with gadolinium (Gd) and/or gadolinium oxide (e.g., $Gd_xO_y$). In certain example embodiments, providing a layer comprising Gd-doped zirconium oxide produces a coating that has lower stress and greater durability. When a layer comprising Gd-doped zirconium oxide is provided as the uppermost or overcoat layer of the coated article (e.g., over a silicon nitride based layer), this results in improved durability, and chemical and heat stability for the coating, in certain example embodiments. Thus, in certain example embodiments, durability of the coated article may be improved if desired. Coated articles herein may be used in the context of insulating glass (IG) window units, vehicle windows, or in other suitable applications such as monolithic window applications, laminated windows, and/or the like.

BACKGROUND AND SUMMARY OF EXAMPLE EMBODIMENTS OF THE INVENTION

Coated articles are known in the art for use in window applications such as insulating glass (IG) window units, vehicle windows, monolithic windows, and/or the like. In certain example instances, designers of coated articles often strive for a combination of high visible transmission, low emissivity (or low emittance), and/or low sheet resistance ($R_s$). High visible transmission may permit coated articles to be used in applications where these characteristics are desired such as, for example, in architectural or vehicle window applications, whereas low-emissivity (low-E), and low sheet resistance characteristics permit such coated articles to block significant amounts of IR radiation so as to reduce for example undesirable heating of vehicle or building interiors. Thus, typically, for coatings used on architectural glass to block significant amounts of IR radiation, high transmission in the visible spectrum is often desired. However, low transmittance and/or high reflectance in the IR and/or near IR part(s) of the spectrum are also desired to reduce for example undesirable heating of vehicle or building interiors.

In certain example embodiments, an overcoat may be provided over a low-E coating or the like in order to increase durability. However, in some instances, these overcoats may experience stress as-deposited, or may experience stress upon being heated, during heat treating, heat bending, thermal tempering, and the like. In certain cases, the stress from these overcoats may negatively affect the overall durability of the coating. Therefore, it may sometimes be desirable to provide a window unit or other glass article with a more durable overcoat.

In view of the above, it will be appreciated that there exists a need in the art for a layer and/or overcoat that may be incorporated into and/or over a low-E stack in order to increase the overall durability of the coated article. Certain example embodiments of this invention relate to a coated article that is durable, has an increased thermal stability, and has a reduced effect on optical characteristics. Certain example embodiments of this invention also relate to a method of making the same.

Certain example embodiments of this invention relate to a coated article comprising a substrate supporting a multi-layer coating on a major surface thereof. The coating comprises a low-E coating and a layer comprising gadolinium (Gd)-doped zirconium oxide over and possibly contacting the low-E coating. The low-E coating comprises, moving away from the substrate: a first dielectric layer, an IR reflecting layer comprising silver, and a second dielectric layer. The layer comprising Gd-doped zirconium oxide includes from about 1 to 20% Gd.

Certain example embodiments of this invention relate to a coated article comprising a functional coating provided on a major surface of a glass substrate. An overcoat layer is provided over the functional coating and/or as the outermost layer of the functional coating. The overcoat layer comprises gadolinium (Gd)-doped zirconium oxide.

According to certain example embodiments, the coated article is heat treated together with the coating. According to certain example embodiments, the coating has a net compressive residual stress following heat treatment and has a reduced tensile stress compared to a coating lacking Gd in the layer comprising Gd-doped zirconium oxide. According to certain example embodiments, the overcoat layer goes through fewer phase changes during the heat treating compared to an overcoat layer lacking Gd.

Certain example embodiments of this invention relate to a method of making a coated article including a coating supported by a glass substrate. A first dielectric layer is disposed, directly or indirectly, on the glass substrate. An IR reflecting layer is disposed over the first dielectric layer. A second dielectric layer is disposed over the IR reflecting layer. An overcoat layer comprising gadolinium (Gd)-doped zirconium oxide is sputter-deposited over the second dielectric layer, with the overcoat layer being the outermost layer of the coating. The glass substrate is heat-treated with the coating thereon. The overcoat layer comprises from about 1 to 20% Gd.

Certain example embodiments of this invention relate to a method of making a coated article including a coating supported by a glass substrate. The glass substrate is provided. A functional layer is disposed, directly or indirectly, on the glass substrate, with the functional layer being an IR reflecting layer. An overcoat layer comprising gadolinium (Gd)-doped zirconium oxide is sputter-deposited over the second dielectric layer, with the overcoat layer being the outermost layer of the coating and comprising from about 1 to 20% Gd. The glass substrate is heat treatable with the coating thereon. The coating has a net compressive residual stress and a reduced tensile stress compared to a coating lacking Gd in the overcoat layer.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Referring now more particularly to the accompanying drawings in which like reference numerals indicate like parts throughout the several views.

Certain example embodiments of this invention relate to a coated article including a Gd-doped zirconium oxide based overcoat, and/or a method of making the same. In certain example embodiments, a temperable/heat-treatable Gd-doped zirconium oxide based overcoat is provided.

As indicated above, low-E coatings and the like are widely used in window applications such as insulating glass (IG) window units, vehicle windows, monolithic windows, and/or the like. These coatings sometimes are susceptible to damage in certain instances, e.g., from the environment, handling, and/or subjecting the coating to heat-treatment, and the like.

Furthermore, the overall durability of a coating may be compromised as a result of the elevated temperatures to which the coated article may be exposed to during the heat-treating process, particularly when even one layer in the coating is prone to stress, phase changes, or instability upon heating. Therefore, there are drawbacks associated with heat-treating certain coatings having certain layers, in some example embodiments.

Layers based on zirconium oxide may be used as an overcoat layer in low-E coatings and the like. However, the existence of multiple phases, and the changes of phases during heat-treating processes of zirconium oxide based films may cause durability issues in the layer and in the entire stack because of, for example, possible volume expansions and stresses in the zirconium oxide based layer.

Zirconium oxide may crystallize in three polymorphs, namely, cubic, tetragonal, and monoclinic. In certain instances, the formation of a specific phase depends upon process coating conditions. The monoclinic phase is generally stable at ambient temperatures, the tetragonal phase is generally stable between 1200 and 2370 degrees C., and the cubic phase is generally stable at temperatures that are higher still. Sometimes it is possible that multiple phases, such as tetragonal and cubic, can co-exist at once. These phases and their respective peaks are shown in FIG. 1.

Figure 1:
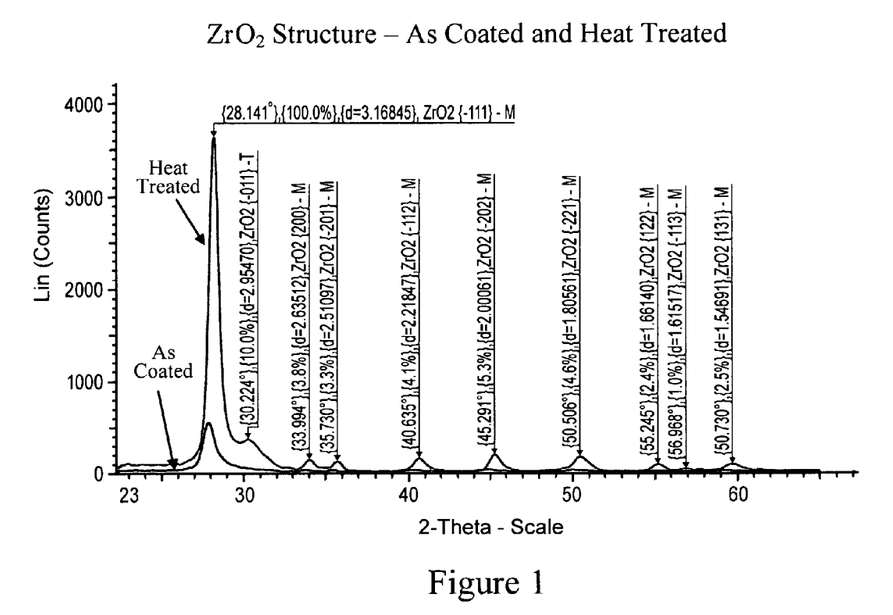
FIG. 1 is a graph of the different phases of zirconium oxide, and shows the structure of zirconium oxide films/layers before and after heating.

FIG. 1 shows the structure of a zirconium oxide film before and after heating. According to FIG. 1, the zirconium oxide film is crystalline before and after heating/heat-treatment. The monoclinic phase of zirconium oxide is dominant, except for one peak of tetragonal phase at 2θ of 30.224° in the scan of a heat-treated zirconium oxide film.

"Pure" zirconium oxide has been used as an overcoat in a low-E stack. For example, see U.S. Pat. No. 7,217,461, the entire contents of which are hereby incorporated herein by reference. However, when overcoat layers of pure zirconium oxide are used in a coating, the thermal stability and durability of the coating may be decreased.

As mentioned above, in certain instances, the existence of multiple phases simultaneously and the phase changes that occur during the heating processes used for zirconium oxide films may cause durability issues (e.g., decreased durability) in layers based on "pure" zirconium oxide (e.g., layers consisting essential of zirconium oxide such as, for example, layers where the zirconium oxide is not intentionally doped). This decreased durability may also impact an overall coating that includes a layer (or layers) based on zirconium oxide. For example, the durability of the layer(s) and/or coating may be compromised because of volume expansions and/or stresses arising, in some instances, from exposure to the temperatures at which heat-treatment is usually performed.

Figure 2:
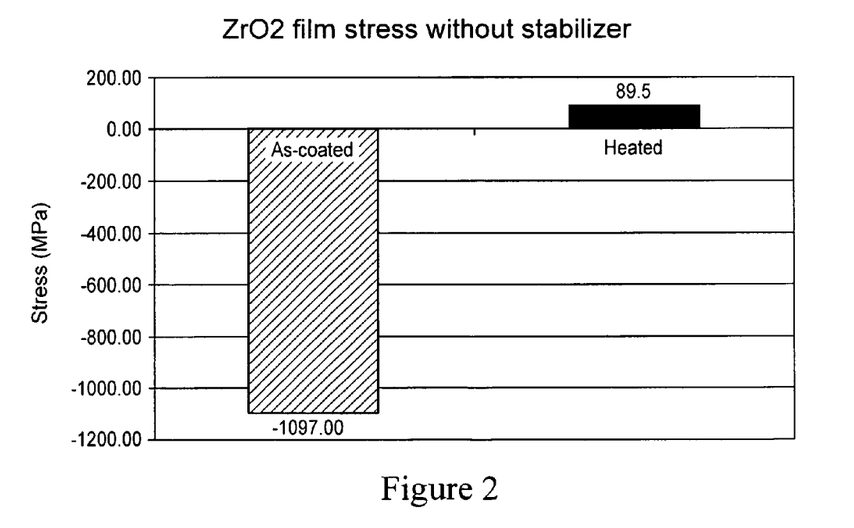
FIG. 2 is a graph showing the stress in a pure (e.g., undoped) zirconium oxide layer, as-coated, and after heating.

Furthermore, using pure zirconium oxide as a layer and/or overcoat layer in a low-E stack may cause the film to experience high compressive stress, as-coated. FIG. 2 shows the stress in a zirconium oxide film that does not contain a dopant/stabilizer before and after heat-treatment. In certain example embodiments, upon heating, the stress in an undoped zirconium oxide based layer (e.g., a layer containing no stabilizer) changes from compressive to tensile. In certain example embodiments, the stress may be residual; e.g., compressive residual stress, tensile residual stress, and/or the like.

Compressive stress, when applied, acts toward the center of a material. Thus, when a material is subjected to compressive stress, the material is under compression. When a material is subjected to tensile stress, on the one hand, the material may suffer stretching or elongation. Accordingly, if too much tensile stress is present in a layer in a coating, the layer and/or coating may suffer deformation, cracking, and/or other types of degradation in certain instances. Therefore, in certain example embodiments, it may be more desirable for a coating to have compressive stress rather than tensile stress.

In order to overcome such issues, the zirconium oxide layer may be doped with gadolinium and/or gadolinium oxide (e.g., Gd and/or $Gd_xO_y$, such as $Gd_2O_3$).

It has surprisingly been found that when a zirconium oxide based layer is doped with gadolinium and/or gadolinium oxide (e.g., Gd and/or $Gd_xO_y$, such as $Gd_2O_3$), the stability of the high temperature phase of zirconium oxide may be improved. In certain example embodiments, the Gd-doped zirconium oxide based layer may be used as an overcoat in a low-E coating. In certain example embodiments, when doped with gadolinium, a zirconium oxide based layer may be more stable, particularly at higher temperatures. In other example embodiments, the stresses of a Gd-doped zirconium oxide based layer may be able to be better-controlled.

In certain example embodiments, when the overcoat of a low-E stack is of, or includes, Gd-doped zirconium oxide, the overall coating may experience better high temperature durability and thermal stability. In some instances, the structure and film surface morphology properties may be advantageously improved, as compared to un-doped zirconium oxide, or even zirconium oxide doped with other materials. This is particularly true at higher temperatures.

For example, when a coating is subjected to a tempering and/or heat-treating process, the heat can cause changes in the coating's structural and morphological properties. It has surprisingly been found that in certain example embodiments, Gd-doped zirconium oxide is more stable at higher temperatures. Therefore, doping zirconium oxide with gadolinium can potentially reduce these structural changes in certain instances, and in further instances may be able to improve the coating's durability-related properties, better than both undoped zirconium oxide and zirconium oxide doped with other materials.

It can be seen from the foregoing that, in certain example embodiments, zirconium oxide doped with gadolinium and/or gadolinium oxide (e.g., $Gd_2O_3$ or other suitable stoichiometry), the high temperature phase of zirconium oxide may be stabilized. In certain instances, when Gd-doped zirconium oxide is used as an overcoat in a coating, particularly in a low-E coating, the Gd-doped $ZrO_x$ layer and the overall coating will have better high temperature durability and thermal stability. Furthermore, in certain example embodiments, a Gd-doped zirconium oxide based layer will experience less stress than undoped zirconium oxide and/or zirconium oxide doped with other materials.

In certain example embodiments, despite the foregoing advantages to the Gd-doped zirconium oxide based layer, the performance of the coating will be improved without significant adverse effects on the optical characteristics of the low-E stacks.

In certain example embodiments, the amount of gadolinium in the zirconium oxide based layer may be from about 1 to 20%, by weight, more preferably, from about 5 to 17% (wt %), and most preferably from about 5 to 15% (wt %).

A metallic target is used to deposit the Gd-doped zirconium oxide based layer in certain example embodiments. In those embodiments, a target comprising zirconium and gadolinium may be used. In certain example embodiments, the target used to deposit the Gd-inclusive $ZrO_x$ layer may include a mixed system of $ZrO_x$—$GdO_x$. The target may comprise, by weight, from about 1 to 40% gadolinium, more preferably from about 5 to 30% gadolinium, and most preferably from about 5-15% gadolinium.

In example embodiments where the Gd-doped zirconium oxide based layer is deposited with a metallic target, the layer may be deposited in the presence of oxygen. The amount of oxygen may be measured based on the power of the Zr-based target, e.g., in mL $O_2$ per kW of the Zr target power. In certain example embodiments, the oxygen will be present in an amount of from about 0.5 to 10 mL/kW, more preferably from about 1 to 6 mL/kW, and most preferably from about 2 to 4.2 mL/kW. Of course, it will be appreciated that other environments also may be used in different embodiments. Such environments may include inert gases such as Ar or the like, or mixtures of reactive and inert gases (e.g., $O_2$ and Ar).

In other example embodiments, a ceramic target may be used. The deposition of the Gd-doped zirconium oxide based layer may take place at room temperature in certain instances and/or may also take place at elevated temperatures. In further embodiments, the gadolinium and zirconium may be deposited in the presence of nitrogen (e.g., $N_2$). After deposition, and upon heating, this nitride layer may become oxygenated, and may result in a Gd-doped zirconium oxide layer, in certain instances.

The Gd-doped zirconium oxide based layer may be used an overcoat in certain example embodiments. For instance, a Gd-doped zirconium oxide based layer according to certain example embodiments of this invention may be used as an overcoat in a low-E coating. A "low-E coating" is a coating that has low-emissivity and may include an IR reflecting layer. The IR reflecting layer may comprise silver, but may also comprise other or alternative materials in certain other embodiments. Other materials used for the IR reflecting layer may be gold, nickel and/or nickel chromium, niobium, alloys thereof, etc.

FIGS. 3-6 show certain example layer stacks incorporating a Gd-inclusive $ZrO_x$ layer in accordance with certain example embodiments of this invention. Of course, other layer stacks may be used in connection with other example embodiments. The Gd-doped zirconium oxide based layer may be used in coatings other than low-E coatings, and may also be positioned in the middle of the stack and/or closer to the glass substrate, in other example embodiments. Moreover, in further embodiments, more than one Gd-doped zirconium oxide based layer may be provided in a coating.

Figure 3:
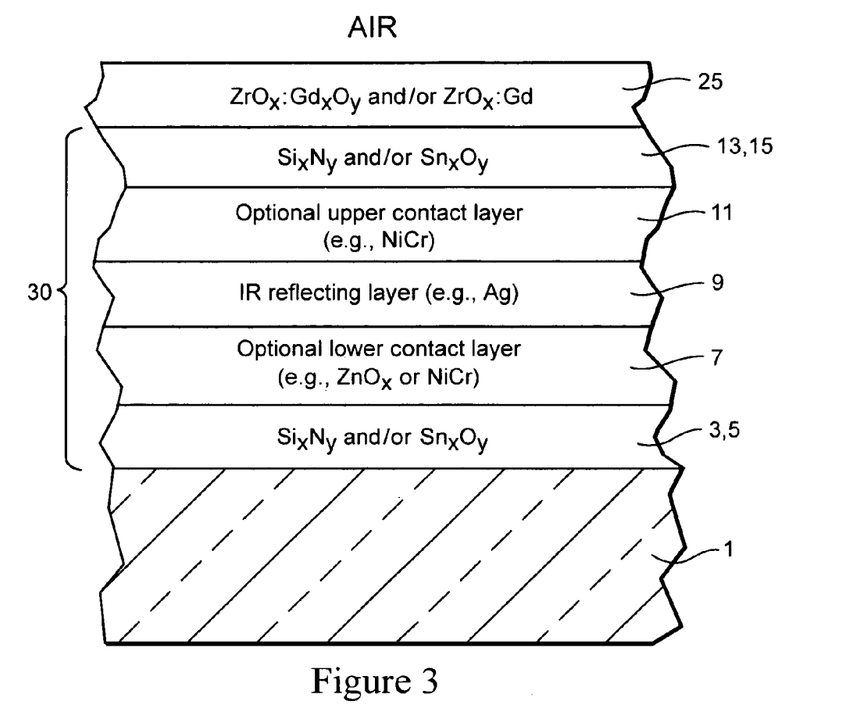
FIG. 3 is a cross-sectional view of a low-E coating with an overcoat thereon according to certain example embodiments of the invention.

FIG. 3 is a side cross sectional view of a coated article according to an example embodiment of this invention. The coated article includes substrate 1 (e.g., clear, green, bronze, or blue-green glass substrate from about 1-12 mm, more preferably 1-10 mm, and most preferably 3-9 mm), and coating (or layer system) 30 provided on the substrate 1 either directly or indirectly. The coating (or layer system) 30 includes: optional dielectric layers 3 and/or 5, optional first lower contact layer 7 (which contacts IR reflecting layer 9), first conductive and preferably metallic infrared (IR) reflecting layer 9, optional first upper contact layer 11 (which contacts layer 9), optional dielectric layer(s) 13 and/or 15, and Gd-doped zirconium oxide based layer 25, which may or may not be used as an overcoat and/or the outermost layer of coating 30 in certain example embodiments of this invention.

Still describing FIG. 3, optional dielectric layer 3 may be of or include a material such as a metal oxide like tin oxide (which may be deposited in one or multiple steps in different embodiments of this invention). Optional dielectric layer 5 may be of or include a material such as silicon that is partially or fully oxided and/or nitrided in different embodiments of this invention (e.g., $Si_3N_4$ or any other suitable stoichiometry). In certain example embodiments, dielectric layers 3 and/or 5 may have a thickness of from about 20 to 60 nm, more preferably from about 25 to 50 nm, and most preferably from about 30 to 45 nm, with an example non-limiting thickness being about 38 nm.

IR reflecting layer 9 may be of or include silver and/or gold or the like, in certain example embodiments. However, this invention is not so limited, and in other example embodiments the IR reflecting layer 9 may be of or include a material other than silver (e.g., niobium, niobium nitride, nickel, and/or a nickel alloy). In certain example embodiments, IR reflecting layer 9 may have a thickness of from about 4 to 12 nm, more preferably from about 4 to 10 nm, and most preferably from about 5 to 8 nm, with an example non-limiting thickness being about 6.7 nm.

Optional first lower contact layer 7 and first upper contact layer 11 may be of or include nickel chromium, an oxide thereof, and oxide of zinc, and/or the like. In certain example embodiments, layers 7 and 9 may each have a thickness of less than about 2 nm, more preferably less than about 1.5 nm, and most preferably less than about 1.2 nm. An example, non-limiting thickness for layer 7 may be about 1.1 nm, and an example, non-limiting thickness for layer 9 may be about 0.8 nm. In further example embodiments, layer 7 may have a thickness that is slightly greater than layer 9. However, in other example embodiments layers 7 and 9 may be substantially similar thickness, and/or layer 9 may be thicker than layer 7.

Optional dielectric layer 13 may be of or include a material such as silicon that is partially or fully oxided and/or nitrided (e.g., $Si_3N_4$ or any other suitable stoichiometry). Optional dielectric layer 15 may be of or include a material such as a metal oxide like tin oxide (which may be deposited in one or multiple steps in different embodiments of this invention). In certain example embodiments, layers 13 and/or 15 may have a thickness of from about 20 to 50 nm, more preferably from about 25 to 45 nm, and most preferably from about 280 to 380 nm, with an example non-limiting thickness of 33 nm.

Gd-doped zirconium oxide based layer 25 may be the overcoat (e.g., the outermost layer) of coating 30 in certain example embodiments. In certain example embodiments, using an overcoat of or including Gd-doped zirconium oxide may result in a more durable and more thermally stable coating, with good optical properties. "Gd-doped" zirconium oxide as used herein refers to zirconium oxide, in any suitable stoichiometry, doped with gadolinium and/or gadolinium oxide (such as $Gd_2O_3$ or other suitable stoichiometry).

In certain example embodiments, only one of dielectric layers 3, 5, 13, and 15 may be present in the coating. In other example embodiments, more than one of dielectric layers 3, 5, 13, and 15 may be present in the coating. Moreover, one or none of the contact layers may used be in certain example embodiments. In other example embodiments, such as those in which the IR reflecting layer comprises a material other than silver, a barrier layer may be used above (e.g., farther from the glass substrate) the IR reflecting layer instead of an upper contact layer.

Figure 4:
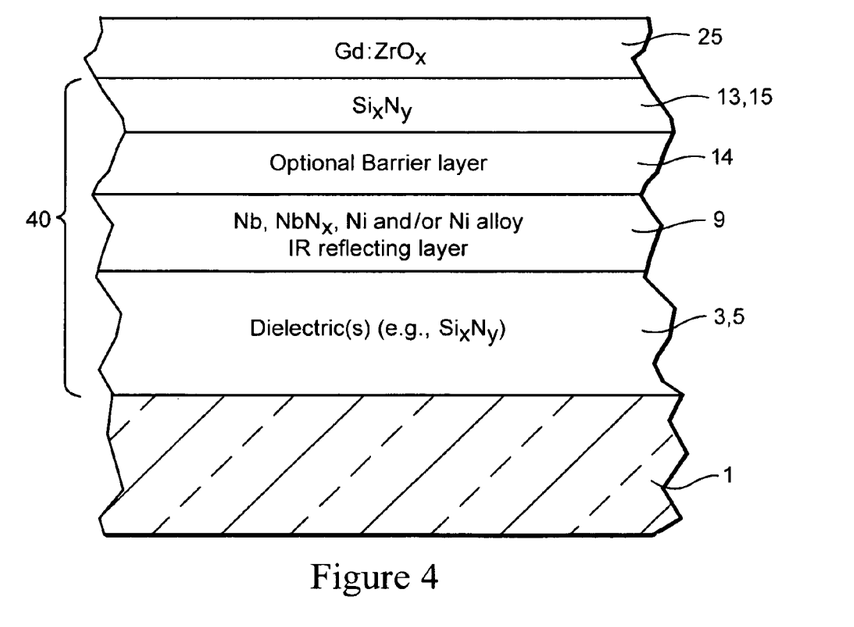
FIG. 4 is a cross-sectional view of a coating including a nickel and/or niobium-based IR reflecting layer with a Gd-doped zirconium oxide based overcoat according to certain example embodiments of the invention.

FIG. 4 is a side cross sectional view of a coated article according to another example embodiment of this invention. Coating and/or layer system 40 in FIG. 4 is similar to coating and/or layer system 30 in FIG. 3, except the IR reflecting layer 9 in FIG. 4 is based on a material other than silver. For example, the IR reflecting layer 9 may be of or include niobium, niobium nitride, nickel, and/or a nickel alloy, or any other suitable IR reflecting material. Preferably, layer 9 will be conductive, although it need not necessarily be conductive in all embodiments. Also, FIG. 4 shows that when the IR reflecting layer is based on a material other than silver, one or both of optional lower and upper contact layers 7 and 9 may not be provided in such example instances. In other example embodiments, an optional barrier layer 14 may be provided over and contacting IR reflecting layer 9 as an alternative to, or in addition to, the contact layers.

Figure 5:
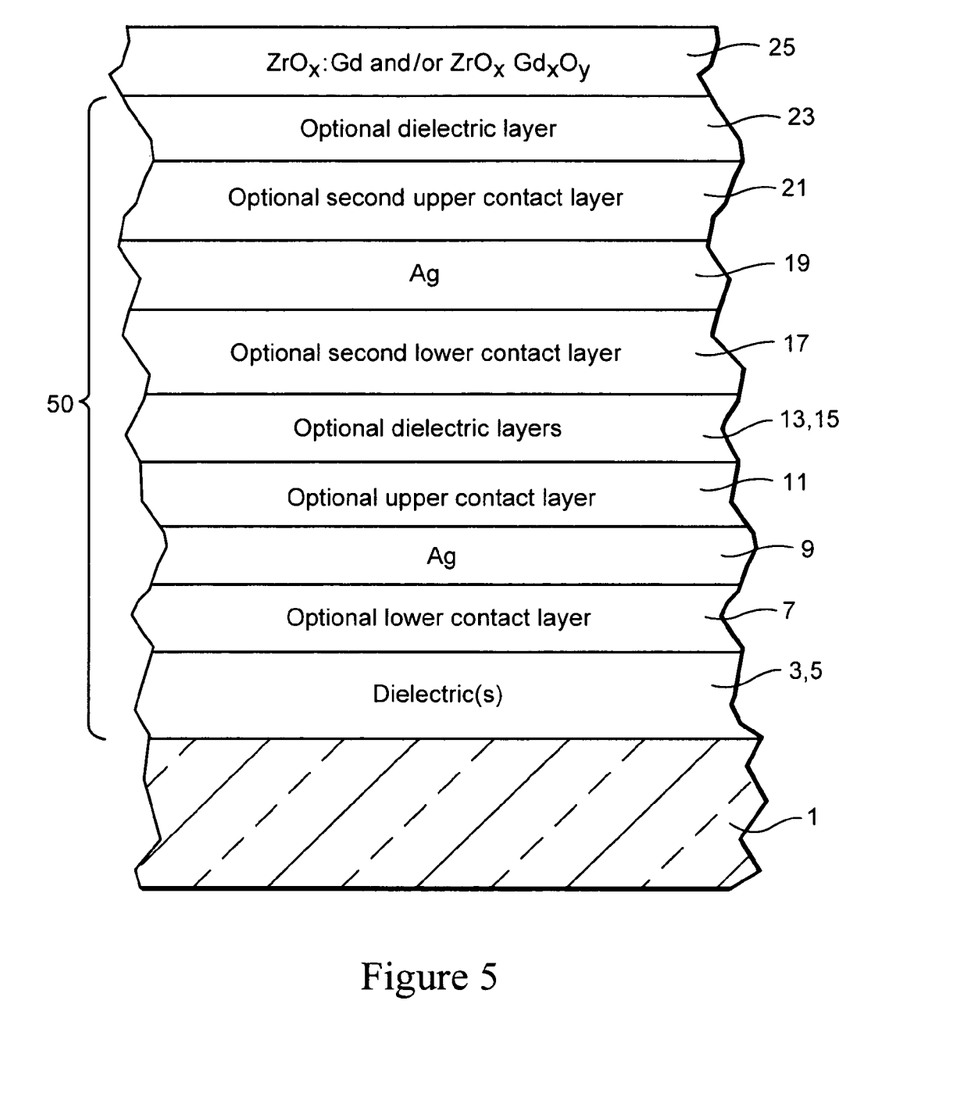
FIG. 5 is a cross-sectional view of a coating including dual-infrared reflecting layers with a Gd-doped zirconium oxide based overcoat according to certain example embodiments of the invention.

FIG. 5 is a side cross sectional view of a coated article according to yet another example embodiment of this invention. Coating and/or layer system 50 in FIG. 5 is similar to coating and/or layer system 30 in FIG. 3, except that the coating has two IR reflecting layers. Therefore, in addition to the layers present in the FIG. 3 embodiment, the coated article also may include second lower contact layer 17 (which contacts IR reflecting layer 19), second conductive and preferably metallic IR reflecting layer 19, second upper contact layer 21 (which contacts layer 19), dielectric layer 23, and finally protective dielectric layer 25. The "contact" layers 7, 11, 17 and 21 each contact at least one IR reflecting layer (e.g., layer based on Ag, Au, or the like). The aforesaid layers 3-25 make up another example embodiment of low-E coating 30 that is provided on glass or plastic substrate 1.

Optional second lower contact layer 17 may be of or include nickel chromium, an oxide thereof, and oxide of zinc, and/or the like. Optional second upper contact layer 21 may also be of or include nickel chromium, an oxide thereof, and oxide of zinc, and/or the like. Optional dielectric layer 23 may be of or include a material such as silicon that is partially or fully oxided and/or nitrided (e.g., $Si_3N_4$ or any other suitable stoichiometry), or include a material such as a metal oxide like tin oxide (which may be deposited in one or multiple steps in different embodiments of this invention). In certain example embodiments, layer 23 may comprise more than one dielectric layer. In certain example embodiments, not all of dielectric layers 3, 5, 13, 15, and 23 may be present in the coating. In other example embodiments, all of dielectric layers 3, 5, 13, 15, and 23 may be present in the coating. Moreover, only one, or none, of the contact layers may used be in certain example embodiments.

Figure 6:
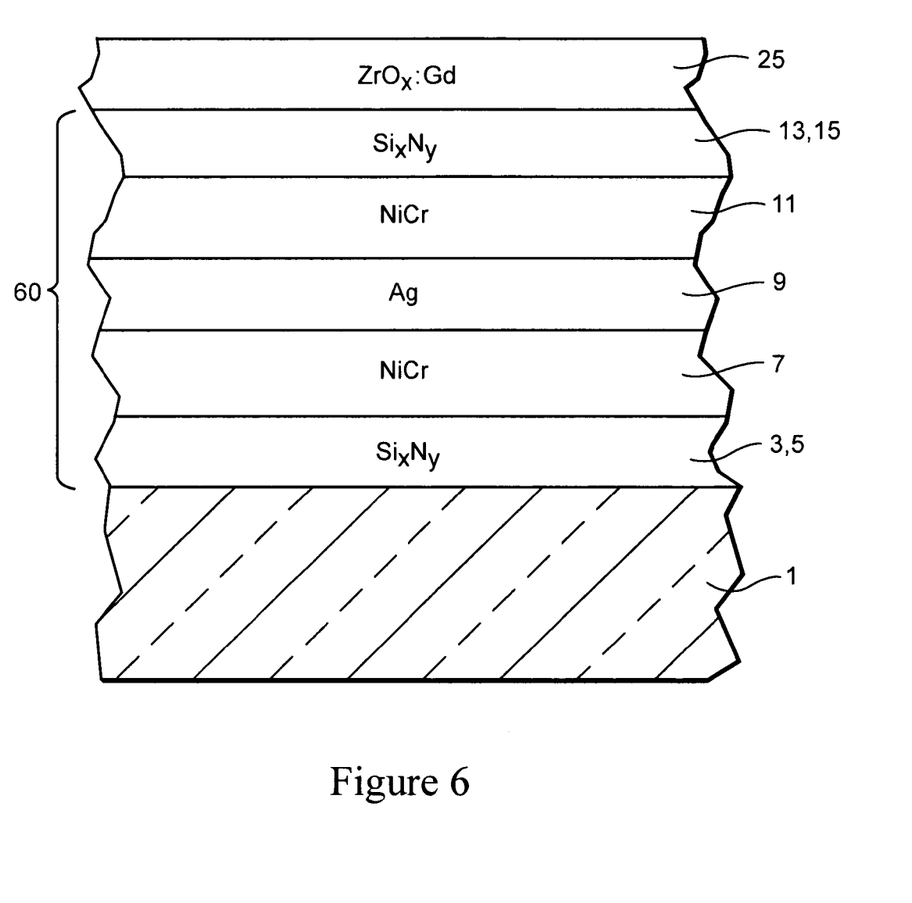
FIG. 6 is a cross-sectional view of a coating including a Gd-doped zirconium oxide based overcoat according to certain example embodiments of the invention.

FIG. 6 represents an exemplary embodiment of this invention. In the coating and/or layer system 60 of FIG. 6, there is only one IR reflecting layer 9, and layer 9 is of or includes silver. First lower contact layer 7 and first upper contact layer 11 both are of or include nickel chromium. Dielectric layers 3 and 13 are present, and are of or include silicon nitride. The overcoat 25 is the outermost layer of the coating, and includes Gd-doped zirconium oxide.

The foregoing embodiments are examples only, and not all layers described in each embodiment must be included in the overall coating. Moreover, in other example embodiments, additional layers may be used. Although several example embodiments are described with respect to low-E coatings, the invention is not so limited. In other example embodiments, a Gd-doped zirconium oxide based layer may be used as an overcoat over any functional coating. In still further example embodiments, a Gd-doped zirconium oxide based layer may be used as a layer in a coating, e.g. the layer may be in between and contacting at least two other layers. The Gd-doped zirconium oxide based layer need not be an overcoat layer and/or an outermost layer in all example embodiments.

In certain example embodiments, particularly (but not limited to) when a layer based on Gd-doped zirconium oxide is used as an overcoat (e.g., the outermost layer) in a low-E coating, the thickness of layer 25 may be from about 1 to 15 nm, more preferably from about 2.5 to 10 nm, and most preferably from about 3 to 7 nm, with an example thickness being 5 nm.

Coating system 30 and/or layer 25 may be dielectric in certain example embodiments.

Other layer(s) below, within, or above the illustrated coating 30 may also be provided. Thus, while the layer system or coating is "on" or "supported by" substrate 1 (directly or indirectly), other layer(s) may be provided therebetween. Thus, for example, the coating 30 of FIG. 3 and the layers thereof may be considered "on" or "supported by" the substrate 1 even if other layer(s) are provided between layer 3 and substrate 1. Moreover, certain layers of the illustrated coating may be removed in certain embodiments, and other layers added in other embodiments of this invention without departing from the overall spirit of certain embodiments of this invention. In certain other example embodiments, coating 30 may consist essentially of layers 3, 7, 9, 11, 13, and 25, and layer 25 may be exposed to the atmosphere (e.g., layer 25 may be the outermost layer of the coating in certain example embodiments). The Gd-inclusive $ZrO_x$ overcoat layers described herein may be used in connection with low-E coatings such, for example, those disclosed in U.S. Publication Nos. 2009/0214880; 2009/0205956; 2009/0324934; 2009/0324967; 2010/0075155; and 2010/0104840, as well as U.S. application Ser. Nos. 12/453,125; 12/453,836; 12/662,561; and 12/662,562, the entire contents of which are hereby incorporated herein by reference.

A coated article as described herein (e.g., see FIGS. 3-6) may or may not be heat-treated (e.g., tempered) in certain example embodiments. The terms "heat treatment" and "heat treating" as used herein mean heating the article to a temperature sufficient to achieve thermal tempering and/or heat strengthening of the glass inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C.

for a sufficient period to allow tempering and/or heat strengthening. This may be for at least about two minutes, or up to about 10 minutes, in certain example embodiments.

Some or all of the layers described herein may be disposed, directly or indirectly, on the substrate 1 via sputtering or other suitable film formation technique such as, for example, combustion vapor deposition, combustion deposition, etc.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A coated article, comprising:
   a substrate supporting a multi-layer coating on a major surface thereof, the coating comprising a low-E coating and a layer comprising gadolinium (Gd)-doped zirconium oxide over the low-E coating,
   wherein the low-E coating comprises, moving away from the substrate:
      a first dielectric layer,
      an IR reflecting layer comprising silver, and
      a second dielectric layer, and
   wherein the layer comprising Gd-doped zirconium oxide includes from about 1 to 20% Gd.

2. The coated article of claim 1, wherein the layer comprising Gd-doped zirconium oxide is an outermost layer of the coating.

3. The coated article of claim 1, wherein the coated article is heat-treated.

4. The coated article of claim 1, wherein the layer comprising Gd-doped zirconium oxide comprises from about 5 to 17% Gd.

5. The coated article of claim 1, wherein the layer comprising Gd-doped zirconium oxide comprises from about 5 to 15% Gd.

6. The coated article of claim 1, wherein the coated article is heat treated together with the coating, and the coating has a net compressive residual stress following heat treatment.

7. The coated article of claim 6, wherein the coating has a reduced tensile stress compared to a coating lacking Gd in the layer comprising Gd-doped zirconium oxide.

8. The coated article of claim 1, wherein the layer comprising Gd-doped zirconium oxide has a thickness of from about 1 to 15 nm.

9. The coated article of claim 1, wherein the layer comprising Gd-doped zirconium oxide has a thickness of from about 2.5 to 10 nm.

10. The coated article of claim 1, wherein the layer comprising Gd-doped zirconium oxide has a thickness of from about 3 to 7 nm.

11. A coated article, comprising:
    a functional coating provided on a major surface of a glass substrate;
    an overcoat layer provided over the functional coating and/or as the outermost layer of the functional coating, wherein the overcoat layer comprises gadolinium (Gd)-doped zirconium oxide.

12. The coated article of claim 11, wherein the coated article is heat treated.

13. The coated article of claim 11, wherein the overcoat layer has a thickness of from about 1 to 15 nm.

14. The coated article of claim 11, wherein the overcoat layer comprises from about 1 to 20% Gd.

15. The coated article of claim 14, wherein the functional coating comprises at least one IR reflecting layer including nickel and/or a nickel alloy.

16. The coated article of claim 14, wherein the coated article is heat treated together with the coating, and the coating has a net compressive residual stress following heat treatment.

17. The coated article of claim 16, wherein the coating has a reduced tensile stress compared to a coating lacking Gd in the layer comprising Gd-doped zirconium oxide.

18. A method of making a coated article including a coating supported by a glass substrate, the method comprising:
    disposing a first dielectric layer, directly or indirectly, on the glass substrate;
    disposing an IR reflecting layer over the first dielectric layer;
    disposing a second dielectric layer over the IR reflecting layer;
    sputter-depositing an overcoat layer comprising gadolinium (Gd)-doped zirconium oxide over the second dielectric layer, the overcoat layer being the outermost layer of the coating; and
    heat-treating the glass substrate with the coating thereon, wherein the overcoat layer comprises from about 1 to 20% Gd.

19. The method of claim 18, wherein after heat treating, the coating has a net compressive residual stress.

20. The method of claim 19, wherein after heat treating, the coating has a reduced tensile stress compared to a coating lacking Gd in the overcoat layer.

21. The method of claim 20, wherein the overcoat layer is sputter-deposited from a metallic target.

22. The method of claim 21, wherein the layer comprising gadolinium (Gd)-doped zirconium oxide is sputter-deposited from a metallic target in the presence of oxygen.

23. The method of claim 22, wherein an amount of oxygen present during deposition is (in mL $O_2$ per kW Zr target power) from about 1 to 6 mL/kW.

24. The method of claim 23, wherein the amount of oxygen present during deposition is (in mL $O_2$ per kW Zr target power) from about 2 to 4.2 mL/kW.

25. The method of claim 22, wherein the overcoat layer goes through fewer phase changes during the heat treating compared to an overcoat layer lacking Gd.

26. A method of making a coated article including a coating supported by a glass substrate, the method comprising:
    providing the glass substrate;
    disposing a functional layer, directly or indirectly, on the glass substrate, the functional layer being an IR reflecting layer; and
    sputter-depositing an overcoat layer comprising gadolinium (Gd)-doped zirconium oxide over the second dielectric layer, the overcoat layer being the outermost layer of the coating and comprising from about 1 to 20% Gd; and
    wherein the glass substrate is heat treatable with the coating thereon, wherein the coating has a net compressive residual stress and a reduced tensile stress compared to a coating lacking Gd in the overcoat layer.

27. The coated article of claim 1, wherein the layer comprising Gd-doped zirconium oxide directly contacts the low-E coating.

* * * * *